United States Patent
Suliman et al.

(10) Patent No.: US 12,398,475 B1
(45) Date of Patent: *Aug. 26, 2025

(54) AQUEOUS ELECTROLYTE METHOD FOR REDUCING CARBON DIOXIDE

(71) Applicant: KING FAHD UNIVERSITY OF PETROLEUM AND MINERALS, Dhahran (SA)

(72) Inventors: Munzir Hamedelniel Mohamed Suliman, Dhahran (SA); Muhammad Usman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/187,408

(22) Filed: Apr. 23, 2025

Related U.S. Application Data

(63) Continuation of application No. 18/584,521, filed on Feb. 22, 2024.

(51) Int. Cl.
| | |
|---|---|
| C25B 1/02 | (2006.01) |
| C01B 32/40 | (2017.01) |
| C25B 1/04 | (2021.01) |
| C25B 1/23 | (2021.01) |
| C25B 3/07 | (2021.01) |
| C25B 3/26 | (2021.01) |
| C25B 9/17 | (2021.01) |

(Continued)

(52) U.S. Cl.
CPC .......... *C25B 11/095* (2021.01); *C01B 32/40* (2017.08); *C25B 1/04* (2013.01); *C25B 1/23* (2021.01); *C25B 3/07* (2021.01); *C25B 3/26* (2021.01); *C25B 9/17* (2021.01); *C25B 11/02* (2013.01); *C25B 11/052* (2021.01)

(58) Field of Classification Search
CPC .... C25B 1/02; C25B 1/23; C25B 3/07; C25B 3/26
USPC ................................ 205/440, 450, 555, 638
See application file for complete search history.

(56) References Cited

U.S. PATENT DOCUMENTS

| | | | |
|---|---|---|---|
| 2015/0345034 A1* | 12/2015 | Sundara | C25B 9/23 205/462 |
| 2023/0383426 A1 | 11/2023 | Han et al. | |
| 2025/0137145 A1* | 5/2025 | Fan | C25B 11/061 |

FOREIGN PATENT DOCUMENTS

| | | |
|---|---|---|
| CN | 112853379 A | 5/2021 |
| CN | 112993283 A | 6/2021 |

(Continued)

OTHER PUBLICATIONS

Hoang et al., "Nanoporous Copper-Silver Alloys by Additive-Controlled Electrodeposition for the Selective Electroreduction of CO2 to Ethylene and Ethanol," Journal of the American Chemical Society (Apr. 5, 2018), vol. 140, No. 17, pp. 5791-5797. (Year: 2018).*

(Continued)

*Primary Examiner* — Edna Wong
(74) *Attorney, Agent, or Firm* — Oblon, McClelland, Maier & Neustadt, L.L.P.

(57) ABSTRACT

A method of reducing carbon dioxide, with a catalyst including silver, copper, and melamine, where the catalyst includes 1-20 wt. % silver based on a weight of the copper, where particles of the catalyst have a polygonal shape and an average size of 0.5-3 μm, and where the copper and the silver form a complex with the melamine.

18 Claims, 8 Drawing Sheets

(51) Int. Cl.
*C25B 11/02* (2021.01)
*C25B 11/052* (2021.01)
*C25B 11/095* (2021.01)

(56) References Cited

FOREIGN PATENT DOCUMENTS

| CN | 113151861 A | * | 7/2021 | ............... | C25B 1/00 |
|---|---|---|---|---|---|
| CN | 114602498 A | | 6/2022 | | |
| CN | 114892196 A | * | 8/2022 | ............... | C25B 3/03 |
| CN | 115845871 A | | 3/2023 | | |
| CN | 115869967 A | | 3/2023 | | |
| WO | 2023/163042 A1 | | 8/2023 | | |

OTHER PUBLICATIONS

Lv et al.; Elastic Ag-anchored N-doped graphene/carbon foam for the selective electrochemical reduction of carbon dioxide to ethanol; Journal of Materials Chemistry A, Issue 12; 2018; Abstract Only; 3 Pages.

He et al., "Advances in Electrolyzer Design and Development for Electrochemical CO2 Reduction," EcoMat. (Jul. 2023), vol. 5, No. 7, pp. 1-17. (Year: 2023).

* cited by examiner

AQUEOUS ELECTROLYTE METHOD FOR REDUCING CARBON DIOXIDE

CROSS-REFERENCE TO RELATED APPLICATIONS

The present application is a Continuation of U.S. application Ser. No. 18/584,521, now U.S. Pat. No. 12/344,947, having a filing date of Feb. 22, 2024.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to an electrocatalyst, particularly, silver (Ag) doped copper (Cu)-melamine complex (Ag—Cu-Mel)-based electrocatalyst, for reducing carbon dioxide.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Carbon dioxide ($CO_2$) is a greenhouse gas inherently found throughout the Earth's atmosphere, and it serves in regulating the planet's temperature through the retention of infrared light. Nevertheless, human actions, particularly the burning of fossil fuels and the clearing of forests, have substantially increased the concentration of $CO_2$ in the Earth's atmosphere. The excess $CO_2$ amplifies the inherent greenhouse effect, resulting in global warming and consequent modifications in climatic patterns.

To address the growing environmental issue of $CO_2$ emissions, a range of scientifically supported solutions and technologies have been developed. There are several methods available for the conversion of $CO_2$, including carbon capture and utilization (CCU), carbon mineralization, biological conversion, electrochemical reduction, hydrogenation, direct air capture (DAC), thermal reduction, catalytic conversion, algae cultivation, chemical synthesis, mineral carbonation, and renewable energy integration. These technologies can reduce $CO_2$ while concurrently generating useful products and promoting sustainable behaviors.

Electrochemical $CO_2$ reduction reaction ($ECO_2RR$) converts $CO_2$ to carbon-based basic chemicals that are environmentally sustainable and do not contribute to climate change. The products produced in $ECO_2RR$ are typically separated into two groups: 1) C1 products containing 1 carbon atom such as carbon monoxide, methanol, methane, and formic acid and 2) C2 products containing 2 carbon atoms such as ethylene and ethanol. The catalyst material employed in the reduction heavily influences the resultant products. Several transition metal catalysts have been studied for $ECO_2RR$, such as (Cu, Co, Zn, Sn, Ni, Bi, etc.), oxides (CuOx, CuO—ZnO, etc.), metal-organic frameworks, and zeolites. Copper exhibits a benefit due to its possession of an intermediate binding energy for the chemical intermediate *CO, hence enabling its catalytic activity in C—C coupling processes. Consequently, the aforementioned process produces value-added commodities containing multiple carbon atoms.

In order to increase the selectivity for converting $CO_2$ into C2 products, one method involves employing a bimetallic catalyst, including copper and a CO-generating substance such as silver, gold, or zinc. The substance that facilitates the formation of carbon monoxide (CO) should enhance the quantity of CO produced, thus altering the preference of copper towards the production of more valuable C2 products. However, $ECO_2RR$ requires relatively high energy for the conversion of $CO_2$ into valuable products due to the high stability of the $CO_2$ molecule in an aqueous electrolyte. In order to lower the energy barrier and improve performance and selectivity, an effective and long-lasting electrocatalyst is needed.

Although electrocatalysts have been developed in the past for $CO_2$ reduction, each of those catalysts suffers from certain drawbacks hindering their adoption. Accordingly, an object of the present disclosure is to develop an electrocatalyst for electrocatalytic reduction of $CO_2$ to valuable C2 products with improved selectivity and efficiency.

SUMMARY

In an exemplary embodiment, a method of reducing carbon dioxide is described. The method includes applying a potential of −0.1 to −2.0 V vs RHE to an electrochemical cell. The electrochemical cell is at least partially submerged in an aqueous solution. Further, on applying the potential, the carbon dioxide is reduced to a conversion product. The electrochemical cell includes an electrode, and a counter electrode. The electrode includes a catalyst and a substrate. The catalyst is dispersed on a surface of the substrate. The catalyst includes silver (Ag), copper (Cu), and melamine. The catalyst includes 1-20 wt. % silver based on a weight of the copper. The particles of the catalyst have a polygonal shape and an average size of 0.5-3 µm. The copper and the silver form a complex with the melamine.

In some embodiments, the catalyst includes 45-55 wt. % N, 15-25 wt. % Cu, 15-25 wt. % Cl, 5-15 wt. % 0, and 1-5 wt. % A g, based on a total weight of the catalyst.

In some embodiments, particles of the catalyst have a polygonal shape having 4-10 sides.

In some embodiments, particles of the catalyst have a rectangular shape with an average length of 0.5-1.5 µm.

In some embodiments, particles of the catalyst are aggregated on a surface of the substrate forming aggregates with an average size greater than 3 µm.

In some embodiments, the catalyst includes about 10 wt. % silver based on a weight of the copper.

In some embodiments, the copper is coordinated to at least one nitrogen atom in a melamine molecule, and the silver is coordinated to at least one nitrogen atom of a different melamine molecule in the complex.

In some embodiments, the copper is coordinated to at least one nitrogen atom in a melamine molecule, and the silver is coordinated to at least one nitrogen atom of the same melamine molecule in the complex.

In an exemplary embodiment, the method of making the electrocatalyst is described. The method includes mixing copper salt, silver salt, and melamine and heating to a temperature of 75-150° C. for at least 10 hours (h) to form a reaction mixture and separating the catalyst from the reaction mixture.

In some embodiments, the copper salt is copper chloride, and the silver salt is silver nitrate.

In some embodiments, a chloride of the copper chloride remains coordinated to the copper in the complex with the melamine. The nitrate of the silver nitrate remains coordinated with the silver in the complex with the melamine.

In some embodiments, the substrate of the electrode is made from at least one material selected from the group consisting of conductive carbon, stainless steel, aluminum, nickel, copper, platinum, zinc, tungsten, and titanium.

In some embodiments, the aqueous solution further includes a base selected from at least one of sodium bicarbonate and potassium bicarbonate.

In some embodiments, the conversion product is at least one selected from formic acid, carbon monoxide, hydrogen gas, and ethanol.

In some embodiments, the conversion product is ethanol and the method has a faradaic efficiency (FE) for reducing carbon dioxide to ethanol of 35% to 45% at −1.0 V vs RHE.

In some embodiments, the catalyst includes about 10 wt. % silver based on a weight of the copper.

In some embodiments, the catalyst has a FE for reducing carbon dioxide to formic acid of 20-30% at −1.0 V vs R H E.

In some embodiments, the catalyst has a FE for reducing carbon dioxide to carbon monoxide of 5-15% at −1.0 V vs R H E.

In some embodiments, the catalyst has a FE for reducing carbon dioxide to hydrogen gas of 5-15% at −1.0 V vs R H E.

In some embodiments, the conversion product includes two carbon atoms.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
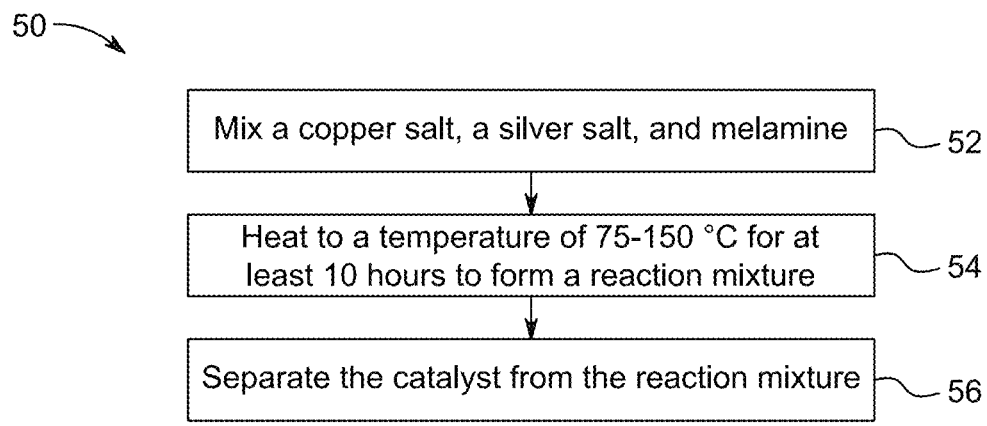
FIG. 1 is a method flowchart for making a bimetallic silver (Ag) doped copper (Cu)-melamine complex (Ag—Cu-MeI) based electrocatalyst, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

Where a numerical limit or range is stated herein, the endpoints are included. Also, all values and subranges within a numerical limit or range are specifically included as if explicitly written out.

Furthermore, the terms "approximately", "approximate", "about," and similar terms generally refer to ranges that include the identified value within a margin of 20%, 10%, or preferably 5%, and any values therebetween. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. A lso, all values and subranges within a numerical limit or range are specifically included as if explicitly written out.

The use of the terms "include," "includes", "including," "have," "has," or "having" should be generally understood as open-ended and non-limiting unless specifically stated otherwise.

As used herein, "particle size" may be thought of as the lengths or longest dimensions of a particle, respectively.

As used herein, the term "room temperature" refers to a temperature in a range of "25° C.±3° C. in the present disclosure.

As used herein, the term 'sonication' refers to the process in which sound waves are used to agitate particles in a solution.

As used herein the terms "electrocatalyst" and "catalyst" are used interchangeably and refer to the catalyst of the invention.

As used herein, the term "electrode" refers to an electrical conductor used to contact a non-metallic part of a circuit e.g., a semiconductor, an electrolyte, a vacuum, or air.

As used herein, the term "current density" refers to the amount of electric current traveling per unit cross-section area.

As used herein, the term "Tafel slope" refers to the relationship between the overpotential and the logarithmic current density.

As used herein, the term "electrochemical cell" refers to a device capable of either generating electrical energy from chemical reactions or using electrical energy to cause chemical reactions.

As used herein, the term "electrolyte" is a substance that forms a solution that can conduct electricity when dissolved in a polar solvent.

As used herein, the term "Faraday efficiency" refers to the efficiency with which charge (electrons) is transferred in a system enabling an electrochemical reaction.

As used herein, the term "overpotential" refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

As used herein, the term "heterocyclic aromatic compound" is intended to mean stable monocyclic and polycyclic aromatic hydrocarbons that include at least one heteroatom ring member such as sulfur, oxygen, or nitrogen. Heteroaryl groups are heterocyclyl groups which are aromatic, and may include, without limitation, pyridyl, pyrrolyl, pyrimidinyl, pyrazinyl, pyridazinyl, triazinyl, furyl, quinolyl, isoquinolyl, thienyl, imidazolyl, thiazolyl, indolyl (e.g., 1H-indolyl), pyrroyl, oxazolyl, benzofuryl, benzothienyl, benzthiazolyl, isoxazolyl, pyrazolyl, triazolyl, tetrazolyl, indazolyl (e.g., 1H-indazolyl), 1,2,4-thiadiazolyl, isothiazolyl, purinyl, carbazolyl, benzimidazolyl, indolinyl, benzodioxolanyl, and benzodioxane. Heteroaryl groups may be substituted or unsubstituted.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NH alkyl), cycloalkylamino (—NH cycloalkyl), arylamino (—NH aryl), arylalkylamino (—NH arylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2N$ H alkyl, —$SO_2N$ H aryl, —$SO_2N$ H arylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CON H arylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The present disclosure is intended to include all hydration states of a given compound or formula, unless otherwise noted or when heating a material.

Aspects of the present disclosure are directed to a silver (Ag) doped copper (Cu)-melamine complex, with varying amounts of silver, used for an electrochemical carbon dioxide ($CO_2$) reduction reaction ($ECO_2RR$) to form useful C2-organic products. The present disclosure shows that the catalyst provides electrochemical performance with improved efficiency and selectivity.

An electrode is described. The electrode includes a substrate and a catalyst. In some embodiments, the substrate may be made from at least one material selected from the group consisting of conductive carbon, stainless steel, aluminum, nickel, copper, platinum, zinc, tungsten, and titanium. In a specific embodiment, the substrate is conductive carbon paper. Carbon papers possess unique properties, such as high electrical conductivity, mechanical strength, and chemical resistance. The substrate may have any suitable shape, as would be known to one of skill in the art.

In some embodiments, the catalyst is dispersed on the surface of the substrate. The particles of the catalyst may form a continuous layer on the substrate. The particles cover at least 50%, preferably 55%, preferably 60%, preferably 65%, preferably 70%, preferably 75%, preferably 80%, preferably 85%, preferably 90%, and preferably >95% of at least one surface of the substrate. In some embodiments, the catalyst is dispersed on the surface of the substrate using a drop-casting method. Drop casting is a technique used to form small coatings on small surfaces. In this method, a solution is dripped onto the substrate as drops and allowed to dry without spreading. Alternate techniques for depositing the catalyst on the substrate include spray coating, spin coating, and dip coating. The particles are dispersed on the substrate to form the electrode.

In some embodiments, the catalyst includes silver (Ag), copper (Cu), and an aromatic compound. In some embodiments, the catalyst further includes or the silver is replaced with gold (Au) and/or zinc (Zn). In some embodiments, the catalyst further includes or the copper is replaced with cobalt (Co), Zn, tin (Sn), nickel (Ni), and/or bismuth (Bi). In some embodiments, the aromatic compound is one or more of benzene, pyridine, furan, indole, and pyrrole. In a preferred embodiment, the aromatic compound is a heterocyclic aromatic compound. In a more preferred embodiment, the heterocyclic aromatic compound is optionally substituted with at least one group selected from the group consisting of an amine (NR'R"R'''), a hydroxyl (ROH), and a sulfide (SR'R"). In a preferred embodiment, the aromatic compound is melamine.

In some embodiments, the copper and the silver form a complex with the melamine. The complex is a coordination complex where melamine acts as a complexation agent (ligand). In some embodiments, the copper is coordinated to at least one nitrogen atom in a melamine molecule and the silver is coordinated to at least one nitrogen atom of a different melamine molecule in the complex. In some embodiments, the copper is coordinated to at least one nitrogen atom in a melamine molecule and the silver is coordinated to at least one nitrogen atom of the same melamine molecule in the complex, thereby forming an alternating structure of Cu and Ag. In some embodiments, the coordinated nitrogen atom of the melamine is a heteroatom of the ring and/or an amine substituted on the ring.

In some embodiments, the silver and copper are included as silver and copper salts respectively. Suitable examples of copper salts include copper benzoate, copper citrate, copper oxide, copper bromide, copper oxalate, copper chloride, copper nitrate, copper sulfate, copper carbonate, copper fluoride, and copper iodide or their hydrate, or mixtures thereof. In a preferred embodiment, the copper salt is copper chloride and its hydrates thereof. In a specific embodiment, the copper salt is copper chloride dihydrate. Silver salts include silver sulfate, silver acetate, silver fluoride, silver chloride, silver bromide, silver iodide, silver cyanide, silver cyanate, silver carbonate, silver perchlorate or their hydrate, or mixtures thereof. In a specific embodiment, the silver salt is silver nitrate and hydrates thereof. In some embodiments, the copper salt is a copper (I) and/or a copper (II) salt. In some embodiments, the silver salt is a silver (I) and/or a silver (II) salt. In some embodiments, the ligands of the copper salt and silver salt remain coordinated to the salt when in the complex with the melamine. For example, a chloride of the copper chloride remains coordinated with the copper in the complex with the melamine, and nitrate of the silver nitrate remains coordinated with the silver in the complex with the melamine.

In some embodiments, the electrocatalyst includes 45-55 wt. %, preferably 46-54 wt. %, preferably 47-53 wt. %, preferably 48-52 wt. %, and preferably 49-51 wt. % N; 15-25 wt. %, preferably 16-24 wt. %, preferably 17-23 wt. %, preferably 18-22 wt. %, and preferably 19-21 wt. % Cu, 15-25 wt. %, preferably 16-24 wt. %, preferably 17-23 wt. %, preferably 18-22 wt. %, and preferably 19-21 wt. % Cl; 5-15 wt. %, preferably 6-14, preferably 7-13, preferably 8-12, and preferably 9-11 wt. % 0, and 1-5 wt. %, preferably 2-4 wt. %, preferably 2.5-3.5 wt. % A g, based on the total weight of the catalyst. In some embodiments, the catalyst includes about 1-20 wt. % A g, preferably 5 wt. %, preferably 10 wt. %, preferably 20 wt. % of silver based on the weight of the copper. In a specific embodiment, the catalyst includes about 10 wt. % Ag based on the weight of the copper.

In some embodiments, the particles of the catalyst may have many shapes, such as cones, cuboidal, rectangular, pyramidical, cylindrical, wires, crystals, rectangles, triangles, prisms, disks, cubes, ribbons, blocks, beads, discs, barrels, granules, whiskers, flakes, foils, powders, boxes, stars, flowers, polygonal like trigonal, pentagonal, hexagonal, etc., and mixtures thereof. In a specific embodiment, the catalyst has a polygonal shape. In some embodiments, the particles of the catalyst have a polygonal shape with 4-10 sides, preferably 4 sides, preferably 5 sides, preferably 6 sides, preferably 7 sides, preferably 8 sides, preferably 9 sides, and preferably 10 sides. In some embodiments, particles of the catalyst have an average size of 0.5-3 µm, preferably 1-2.5 µm, and preferably 1.5-2 µm. In some embodiments, the particles of the catalyst have a rectangular shape with an average length of 0.5-1.5 µm, and preferably 0.75-1.25 µm. In some embodiments, the particles of the catalyst are aggregated on the surface of the substrate, forming aggregates with an average size greater than 3 µm, preferably 3-10 µm, 4-9 µm, 5-8 µm, or 6-7 µm. In a preferred embodiment, the aggregates are connected and form a continuous layer on the substrate.

FIG. 1 illustrates a flow chart of a method 50 of a method of making an electrocatalyst (Ag—Cu-Mel). The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing a copper salt, a silver salt, and melamine, embodiments of which are previously described. The mixing may be carried out manually or with the help of a stirrer. In an embodiment, melamine is used as a complexation agent to form the bimetallic silver-doped copper coordination complex (Ag—Cu-Mel). In some embodiments, a weight ratio of copper salt to melamine is 1:5 to 5:1 weight ratio, preferably 1:4 to 4:1, preferably 3:1 to 1:3 weight ratio, preferably 1:2 to 2:1 weight ratio, and more preferably a 1:1 weight ratio, in the solvent. In a preferred embodiment, the weight ratio of the copper salt to melamine is 1:1.47.

At step 54, the method 50 includes heating the mixture to a temperature of 75-150° C., preferably 80-145° C., preferably 85-140° C., preferably 90-135° C., preferably 95-130° C., preferably 100-125° C., preferably 105-120° C., and preferably 110-115° C. for at least 10 hours (h), preferably 11 h, preferably 12 h, preferably 13 h, preferably 14 h, and preferably 15 h to form a reaction mixture. In a specific embodiment, the heating of the mixture is done at a temperature of 100° C. for 14 h. The heating can be done by using heating appliances such as hot plates, heating mantles ovens, microwaves, autoclaves, tapes, oil baths, salt baths, sand baths, air baths, hot-tube furnaces, and hot-air guns.

At step 56, the method 50 includes separating the catalyst from the reaction mixture. The separation is done by centrifugation. Other suitable techniques for separation include internal and external filtration, natural and forced sedimentation, magnetic separation, vacuum distillation, and chemical conversion. In a specific embodiment, the catalyst is separated by centrifugation. The solvent used for centrifugation may be water, alcohol, or ether. The water may be tap water, distilled water, bidistilled water, deionized water, deionized distilled water, reverse osmosis water, and/or some other water. The alcoholic solvents include methanol, ethanol, propanol, butanol, and iso-propanol. The ether solvents include ethyl methyl ether, dimethyl ether, diethyl ether, and diphenyl ether. In a specific embodiment, the solvent is diethyl ether.

A method for reducing carbon dioxide is described. In some embodiments, a method of reducing carbon dioxide includes applying a potential of −0.1 to −2.0 V, preferably −0.2 to −1.8 V, preferably −0.4 to −1.6 V, preferably −0.6 to −1.4 V, and preferably −0.8 to −1.2 V vs (reversible hydrogen electrode) RHE to an electrochemical cell. In a specific embodiment, a potential of −0.1 V is applied vs RHE to the electrochemical cell. A negative voltage is applied to the working electrode, and a positive voltage is applied to the counter electrode. The electrochemical cell includes a working electrode, a counter electrode, and optionally a reference electrode. The high stability of the electrode potential is usually reached by employing a redox system with constant (buffered or saturated) concentrations of each relevant species of the redox reaction. The working electrode is the Ag—Cu-MeI catalyst on the substrate. A reference electrode may enable a potentiostat to deliver a stable voltage to the working or counter electrodes. In some embodiments, the counter electrode may contain an electrically-conductive material such as platinum, platinum-iridium alloy, iridium, titanium, titanium alloy, stainless steel, gold, cobalt alloy, and/or some other electrically-conductive material, where an "electrically-conductive material" as defined here is a substance with an electrical resistivity of at most $10^{-6}$ ohms meter ($\Omega \cdot m$), preferably at most $10^{-7}$ $\Omega \cdot m$, more preferably at most $10^{-8}$ $\Omega \cdot m$ at a temperature of 20-25° C. The form of the counter electrode may be generally relevant only in that it needs to supply sufficient current to the electrolyte solution to support the current required for the electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode. In a preferred embodiment, the counter electrode is platinum mesh.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is Ag/AgCl electrode. However, in some embodiments, the electrochemical cell does not include a third electrode.

In a preferred embodiment, the electrochemical cell is a H-cell. An H-cell is a divided electrochemical cell, having of two compartments connected through a diaphragm. In a preferred embodiment, the diaphragm is a proton exchange membrane. In a more preferred embodiment, the electrochemical cell is a flow cell. The flow cell configuration includes three main components. The initial component included a dual-compartment system designed to contain electrolytes. One of the compartments was designated for the catholyte, while the other was designated for the anolyte. Both compartments contained a solution of water and an inorganic base. The second constituent of the system is the cell, including a cathode section whereby $CO_2$ gas is directed through one side of a gas diffusion electrode (GDE), while the catholyte is directed through the opposite side. The anode compartment is linked to the anolyte. The cellular constituents are segregated by an anionic membrane. The pump, the third component of the flow cell, plays a role in enabling the movement and circulation of the catholyte and anolyte between the compartments that house the electrolytes within the cell. The reference electrode, like the hydrogen fuel cell (H-Cell), is connected to the working electrode (GDE) on the cathode side and the counter electrode on the anode side. All the components above are interconnected with the potentiostat workstation.

The electrochemical cell is at least partially submerged in an aqueous solution containing carbon dioxide, preferably 50%, preferably 60%, more preferably at least 70%, 80%, 90%, or fully submerged. Preferably, to maintain uniform concentrations and/or temperatures of the aqueous solution, the aqueous solution may be stirred or agitated during the step of the subjecting. The stirring or agitating may be done intermittently or continuously. This stirring or agitating may be done by a magnetic stir bar, a stirring rod, an impeller, a shaking platform, a pump, a sonicator, a gas bubbler, or some other device. Preferably, the stirring is done by an impeller or a magnetic stir bar.

The aqueous solution may include water and an inorganic base. The water may be tap water, distilled water, bi-distilled water, deionized water, deionized distilled water, reverse osmosis water, and/or some other water. The aqueous solution has a salt concentration of 0.05-2 molar (M), preferably 0.1-1 M, and preferably 0.25-0.5 M. In a preferred embodiment, the aqueous solution has a salt concentration of 0.5 M. In some embodiments, the salt may include ammonium bicarbonate, barium carbonate, calcium carbonate, magnesite, sodium percarbonates, and sodium carbonate. In some embodiments, the base is selected from at least one of sodium bicarbonate ($NaHCO_3$) and potassium bicarbonate ($KHCO_3$). In a preferred embodiment, the salt is $KHCO_3$.

In one embodiment, the potential may be applied to the electrodes by a battery, such as a battery including one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an A C adaptor plugged into a standard building or home electric utility line. In one embodiment, the potentiostat may connect with a reference electrode in the electrolyte solution. Preferably, the potentiostat can supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as increased or decreased linearly, applied as pulses, or applied with an alternating current.

Applying the potential reduces the carbon dioxide to a conversion product. The conversion product is at least one of formic acid, carbon monoxide, hydrogen gas, and ethanol. In some embodiments, the conversion product includes one or two carbon atoms. In a preferred embodiment, the conversion product includes two carbon atoms, for example ethanol.

In some embodiments, the conversion product is ethanol, and the method has a faradaic efficiency (FE) for reducing carbon dioxide to ethanol of 35-45%, preferably 36-44%, preferably 37-43%, preferably 38-42%, and preferably 39-41% at −1.0 V vs RHE. In an embodiment, the method has a FE for reducing carbon dioxide to ethanol of 40% at −1.0 V vs RHE. In some embodiments, the FE for reducing carbon dioxide to ethanol of 35-45%, includes the catalyst with about 10 wt. % silver based on a weight of the copper.

In some embodiments, the method has a FE for reducing carbon dioxide to formic acid of 20-30%, preferably 21-29%, preferably 22-28%, preferably 23-27%, and preferably 24-26% at −1.0 V vs RHE. In some embodiments, the method has a FE for reducing carbon dioxide to carbon monoxide of 5-15%, preferably 6-14%, preferably 7-13%, preferably 8-12%, and preferably 9-11% at −1.0 V vs RHE. In some embodiments, the method has a FE for reducing carbon dioxide to hydrogen gas of 5-15%, preferably 6-14%, preferably 7-13%, preferably 8-12%, and preferably 9-11% at −1.0 V vs RHE. In some embodiments, the method produces a mixture of formic acid, carbon monoxide, hydrogen gas, and ethanol, wherein ethanol is the major product.

While not wishing to be bound to a single theory, it is thought that the incorporation of Ag along with Cu enables the catalytic activity of Cu in the formation of CO and subsequently results in C—C coupling processes, thereby producing more C2 products. However, unexpectedly, too much of the Ag can lead to increased formation of CO instead of C2 products. Further, the unique morphology and improved current density of the catalysts enhance the electrocatalytic surface area and activity.

In some embodiments, the electrode may be used for other purposes such as but not limited to hydrogen or oxygen evolution reaction in water splitting, or it can be incorporated into a supercapacitor.

EXAMPLES

The following examples demonstrate an electrocatalyst as described herein. The examples are provided solely for illustration and are not to be construed as limitations of the present disclosure, as many variations thereof are possible without departing from the spirit and scope of the present disclosure.

Example 1: Materials

Copper chloride dihydrate ($CuCl_2 \cdot 2H_2O$) (99.95%) and melamine (99.0%) were purchased from Sigma Aldrich, U S. M ethanol ($CH_3OH$) (99.8%) and diethyl ether (($CH_3CH_2)_2O$) (99.9%) were procured from Sharlu (Sharjah, United Arab Emirates). Nitrogen gas ($N_2$) was supplied by Abdullah Hashem Industrial Gas Co., Ltd., Dammam, Saudi Arabia.

Example 2: Synthesis of a Copper Melamine Complex (Cu-MeI)

A solution containing 170 mg of copper chloride dihydrate was prepared by dissolving it in 20 milliliters (mL) of methanol purged with nitrogen gas. Subsequently, 250 mg of melamine was added to the solution. The solution was subjected to thermal treatment at 100 degrees Celsius (°C) for 14 hours (h). Subsequently, the solution was allowed to cool to ambient temperature, collecting a green powder. This powder was subjected to three rounds of centrifugation with diethyl ether, followed by a final drying process under vacuum conditions at a temperature of 50 °C.

Example 3: Synthesis of Silver-Copper Melamine Complex (Ag—Cu-MeI)

A solution was prepared by dissolving 170 milligrams (mg) of copper chloride dihydrate and varying quantities of silver nitrate in 20 mL of methanol purged with nitrogen gas. Subsequently, 250 mg of melamine was added to the solution. The solution was subjected to thermal treatment at a temperature of 100° C. for 14 h. Subsequently, the solution was allowed to undergo cooling to reach ambient temperature, resulting in the collection of a green powder. This powder was subjected to three rounds of washing through centrifugation with diethyl ether, followed by a final drying process under vacuum conditions at a temperature of 50° C. The silver-to-copper ratio was 5%, 10%, and 20%. The samples are labeled as x % Ag—Cu-MeI, based on the amount of silver.

Example 4: Characterization Techniques

Morphological and detailed microstructural attributes of the materials were discerned by field emission scanning electron microscopy (FESEM, Tescan Lyra-3, Brno, Czechia). The crystal structure was determined by X-ray diffraction (XRD, Rigaku MiniFlex, Japan) and proton ($^1H$) nuclear magnetic resonance (NMR) spectroscopy (LAMBDA 500 spectrophotometer, San Francisco, U.S.A). Potentiostat (Gammray 620) was used for electrochemical analysis.

Example 5: Preparation of the Electrode

A dispersion of the catalyst, consisting of 10 mg, was prepared by mixing it with a solution containing 750 microliters (μl) of isopropanol, 200 μl of deionized water, and 50 μl of Nafion (5%). The total volume of the combination was 1 mL. The solution underwent sonication for 20 minutes. Next, 100 μl of the suspension was applied onto a conductive carbon paper measuring 1 $cm^2$ using the drop-casting method. Afterward, the sample was allowed to dry at ambient temperature.

Example 6: Electrochemical Investigation Techniques

The performance of the $ECO_2R$ is examined using an H-cell system that includes a silver chloride electrode (Ag/AgCl) as a reference electrode. A counter electrode composed of platinum mesh was utilized. The working electrode used in this study was the electrocatalyst above. The electrodes in the cell are coupled to a potentiostat, specifically the Gammray 620 model. The performance of $ECO_2R$ was assessed by implementing linear sweep voltammetry (LSV) methodologies, which involved determining the overpotential at various current densities, with the current values normalized to the geometric surface area of the electrode. The cyclic voltammetry (CV) and linear sweep voltammetry (LSV) tests were conducted using a 0.5 M potassium bicarbonate ($KHCO_3$) solution. The voltage range considered in this study spanned from 0.0 to −1.5 V versus the reversible hydrogen electrode (RHE). The electrochemical impedance spectroscopy (EIS) was conducted by systematically altering the frequency range from $10^5$ to 0.1 Hz while maintaining consistent electrolyte and electrode conditions as in the linear sweep voltammetry (LSV) experiment.

The evaluation of the reduction products involved conducting potentiostatic measurements at various potentials (−0.6 to −1.2) for a duration of 1 h. Subsequently, the liquid products were taken from the cell and quantified using proton nuclear magnetic resonance ($H^1$-NMR), while the gaseous products were analyzed by Gas chromatography-Barrier Ionization Discharge (GC-BID).

Example 7: Structural and Morphological Characterization

Figure 2:
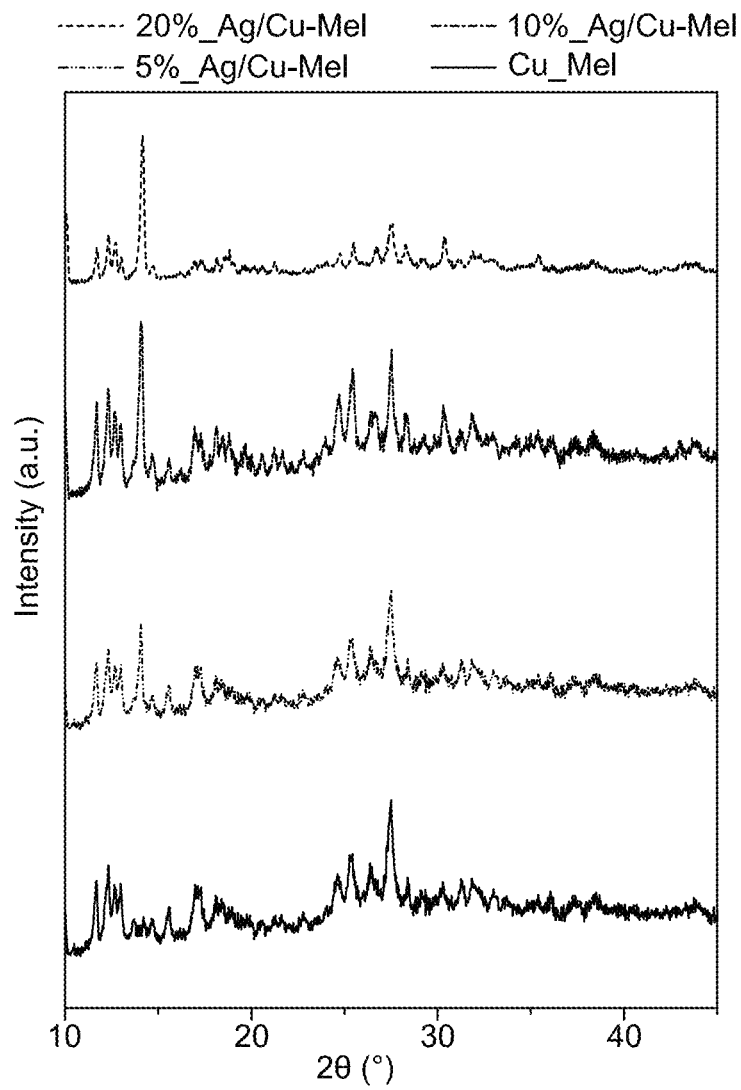
FIG. 2 shows X-ray diffraction (XRD) patterns of a copper-melamine (Cu-MeI) complex and x % Ag—Cu-MeI complex (x=5, 10, and 20), with varying amounts of Ag, according to certain embodiments.
Figure 3:
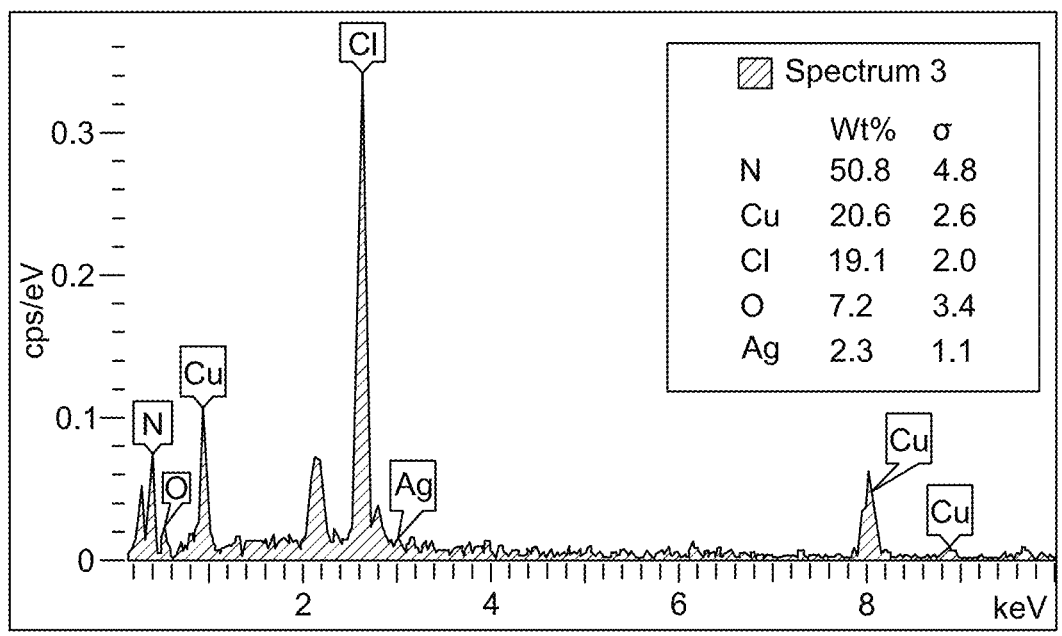
FIG. 3 shows an energy dispersive X-ray (EDX) spectrum of 10% Ag—Cu-MeI complex, according to certain embodiments.
Figure 4A:
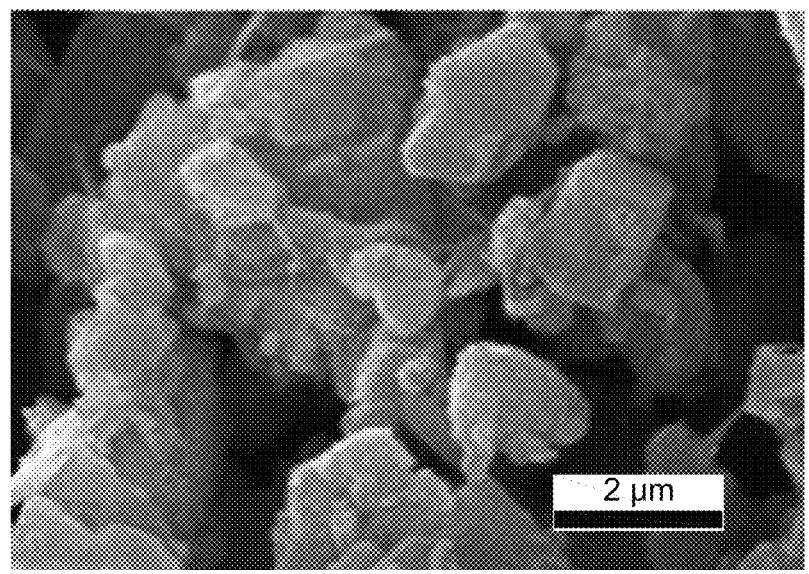
FIG. 4A is a scanning electron microscopic (SEM) micrograph of the Cu-MeI complex, according to certain embodiments.
Figure 4B:
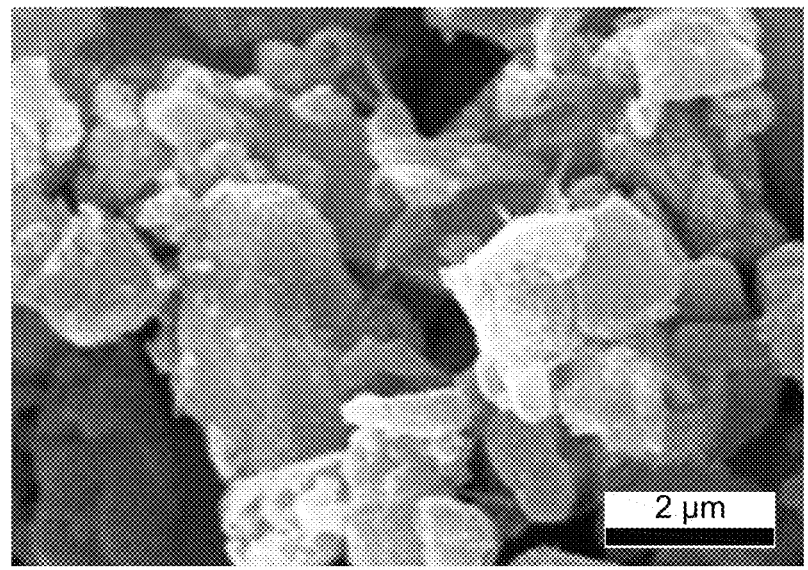
FIG. 4B is a SEM micrograph of 5% Ag—Cu-MeI complex, according to certain embodiments.
Figure 4C:
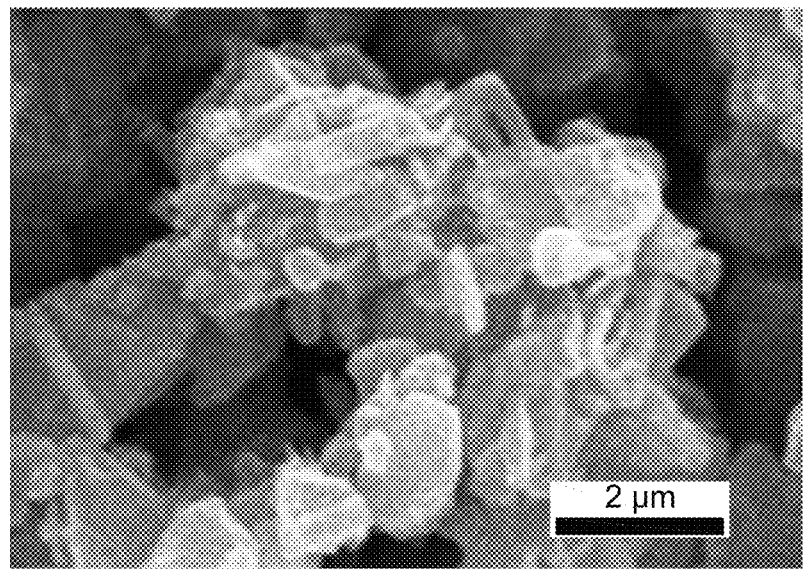
FIG. 4C is a SEM micrograph of 10% Ag—Cu-MeI complex, according to certain embodiments.
Figure 4D:
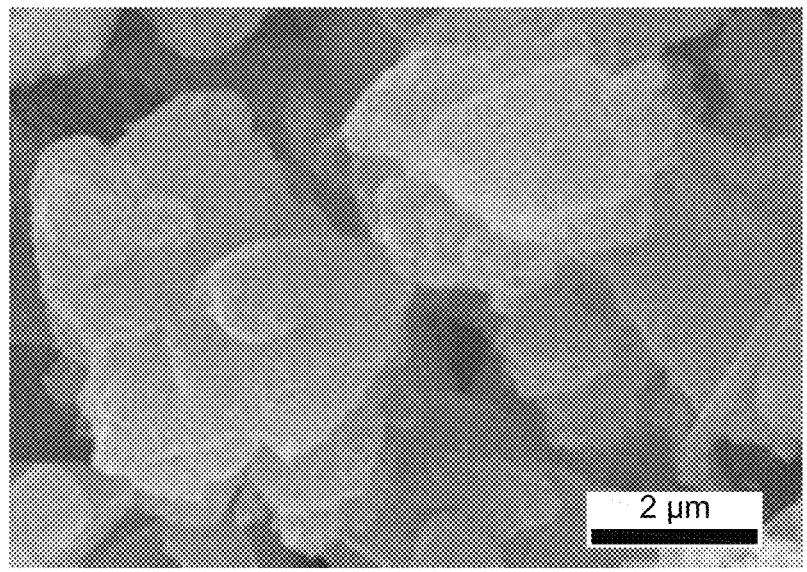
FIG. 4D is a SEM micrograph of 20% Ag—Cu-MeI complex, according to certain embodiments.

X-ray diffraction (XRD) was carried out to investigate the phase formation and purity of the prepared material. As can be observed in FIG. 2, sharp reflection peaks were observed between angles 10° and 30° in the case of sample Cu-MeI samples. The sharp peaks at low diffraction angles with no appearance of Cu precursor and melamine peaks prove the formation of a complex. For the Ag-doped Cu-MeI sample, an identical diffraction pattern to Cu-MeI was observed, with an additional peak at 14°; the intensity of this peak increased with the Ag loading increment, which confirmed the formation of the bi-metallic complex. As shown in FIG. 3, the EDX of 10% Ag—Cu-MeI shows the presence of all complex elements Cu, Ag, O, N, and Cl, and the ratio between Ag and Cu is almost 10%.

SEM analysis was used to investigate the morphological and structural qualities of the material that had been created. The SEM images for Cu-MeI, 5% Ag—Cu-MeI, 10% Ag—Cu-MeI, and 20% Ag—Cu-MeI are displayed in FIGS. 4A-4D, respectively. The sample in question exhibits distinct crystals with a semi-cubic form when viewed using a SEM.

Example 8: Electrochemical Performance

Figure 5A:
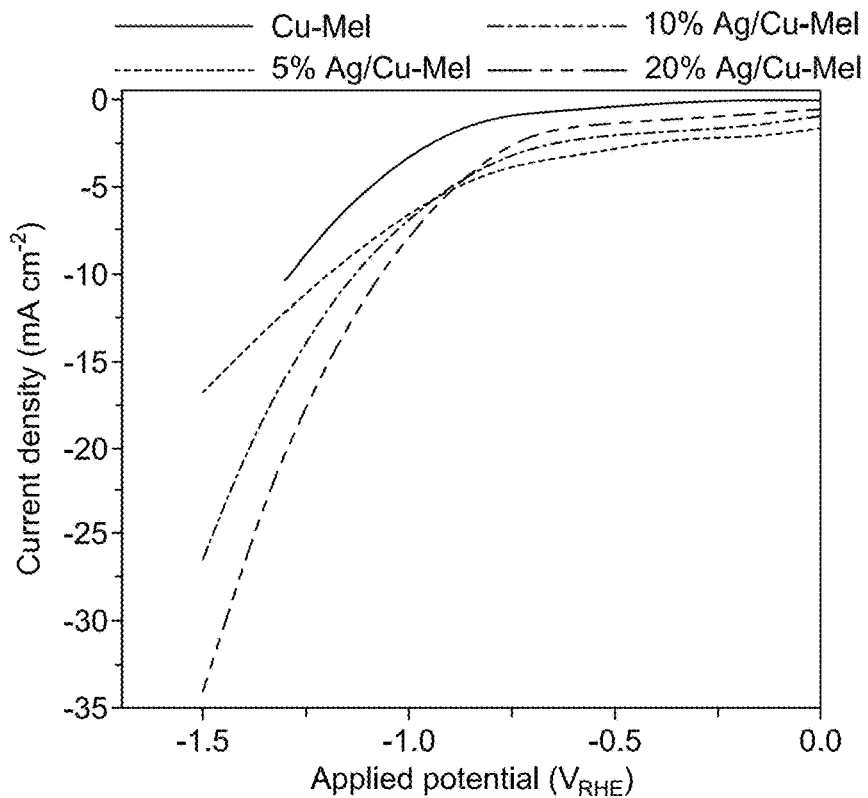
FIG. 5A shows linear sweep voltammetry (LSV) polarization curves of x % Ag—Cu-MeI complex (x=0, 5, 10, and 20), according to certain embodiments.

To study the electrochemical performance, the LSV for the electrodes Cu-MeI, 5% Ag-Cu—MeI, 10% Ag—Cu-MeI, and 20% Ag—Cu-MeI was carried out in an electrolyte saturated with $CO_2$ and compared in FIG. 5A. It can be seen that the current density of Cu-MeI without Ag was revealed to be lower. The loading with 5% Ag resulted in a considerable rise in the current density, which went from −8 to −16 mA cm$^{-2}$. The current density grew as the loading of silver increased, reaching a maximum of −35 mA cm$^{-2}$ for 20% Ag—Cu-MeI and a value of −27 mA cm$^{-2}$ for 10% silver loading.

Figure 5B:
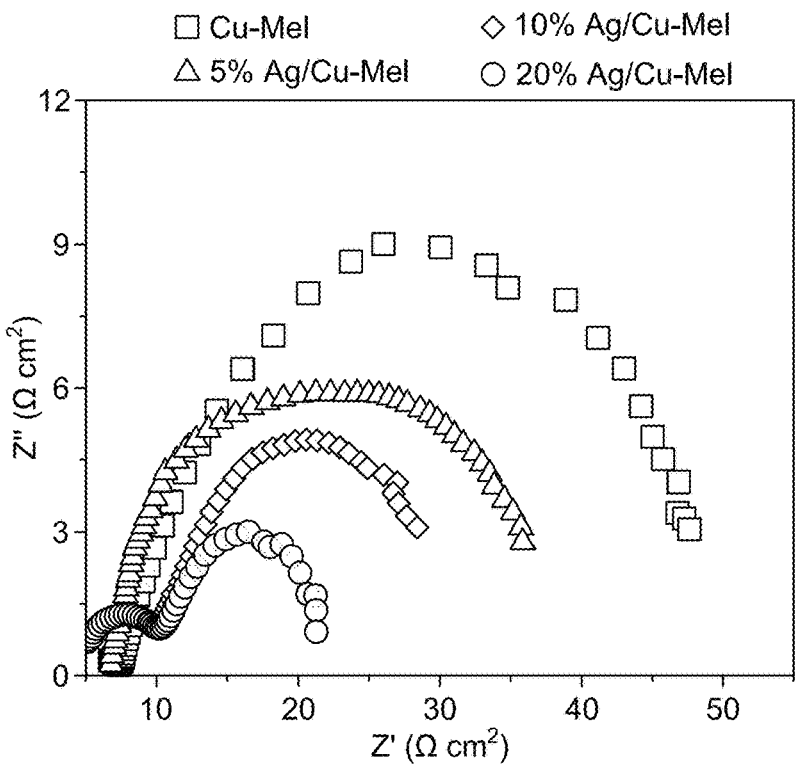
FIG. 5B shows electrochemical impedance spectroscopic (EIS) curves of x % Ag—Cu-MeI complex (x=0, 5, 10, and 20), according to certain embodiments.

Electrochemical impedance spectroscopy (EIS) was employed to investigate the interaction occurring at the interface between the electrode and electrolyte. The charge transfer resistance ($R_{ct}$) was determined from the Nyquist plot, which shows the smaller semicircle, indicating higher conductivity obtained from the EIS experiment. The reported values for the $R_{ct}$ (charge transfer resistance) were 10, 19, 30, and 45 Ωcm$^2$ for the electrodes with compositions of 20% Ag—Cu-MeI, 10% Ag—Cu-MeI, 5% Ag—Cu-MeI, and Cu-MeI, respectively (FIG. 5B). It is evident that the addition of Ag to Cu-MeI significantly improves the rate of charge transfer, with the 20% loading demonstrating the lowest $R_{ct}$.

Figure 6A:
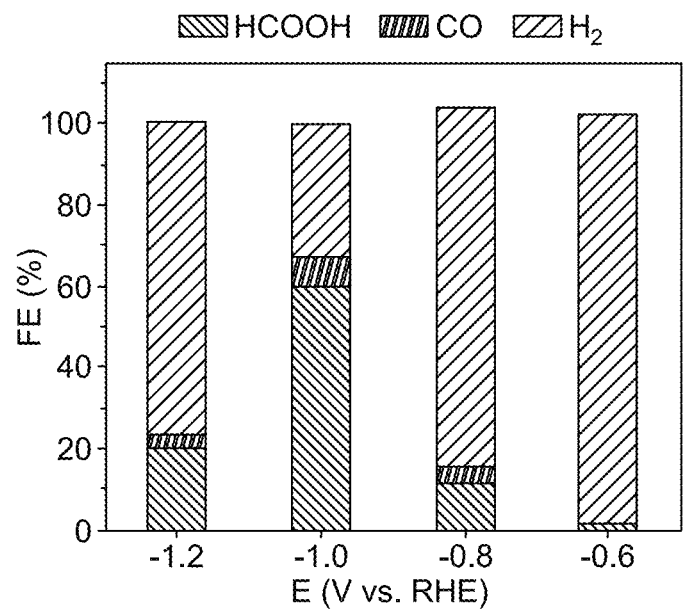
FIG. 6A shows the variation of faradaic efficiency (FE) with the potential (V vs RHE) for the formation of formic acid (HCOOH), carbon monoxide (CO), and hydrogen ($H_2$) by the Cu—MeI complex, according to certain embodiments.
Figure 6B:
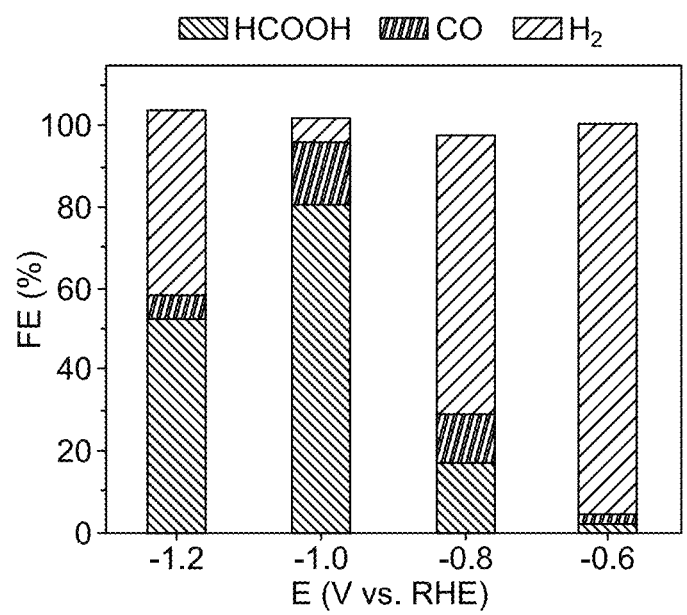
FIG. 6B shows the FE with the potential (V vs RHE) for the formation of HCOOH, CO, and $H_2$ by the 5% Ag—Cu-MeI complex, according to certain embodiments.
Figure 6C:
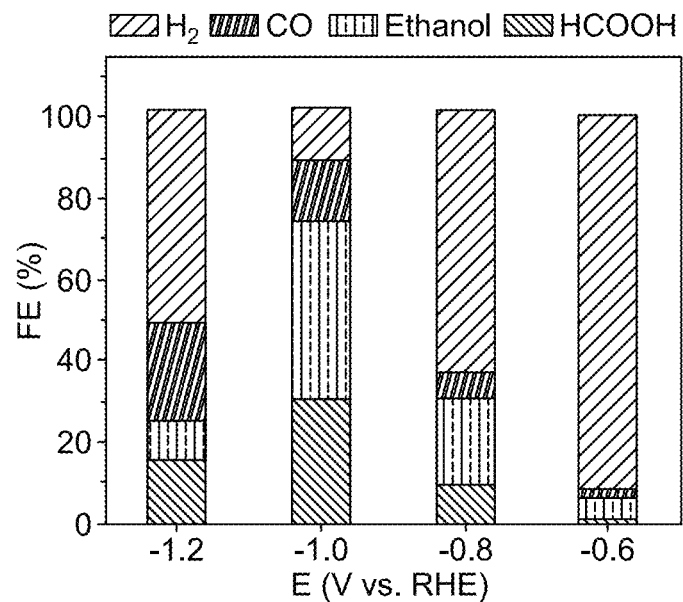
FIG. 6C shows the FE with the potential (V vs RHE) for the formation of ethanol, HCOOH, CO, and $H_2$ by the 10% Ag—Cu-MeI complex, according to certain embodiments.
Figure 6D:
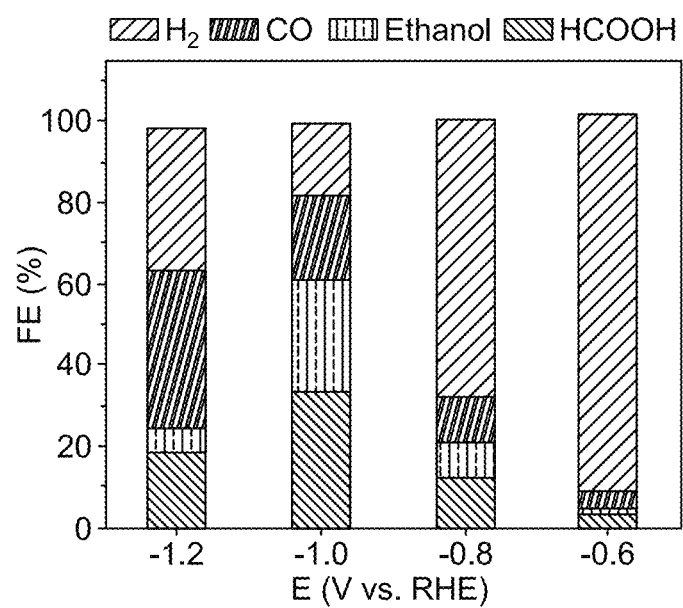
FIG. 6D shows the FE with the potential (V vs RHE) for the formation of ethanol, HCOOH, CO, and $H_2$ by the 20% Ag—Cu-MeI complex, according to certain embodiments.
Figure 7:
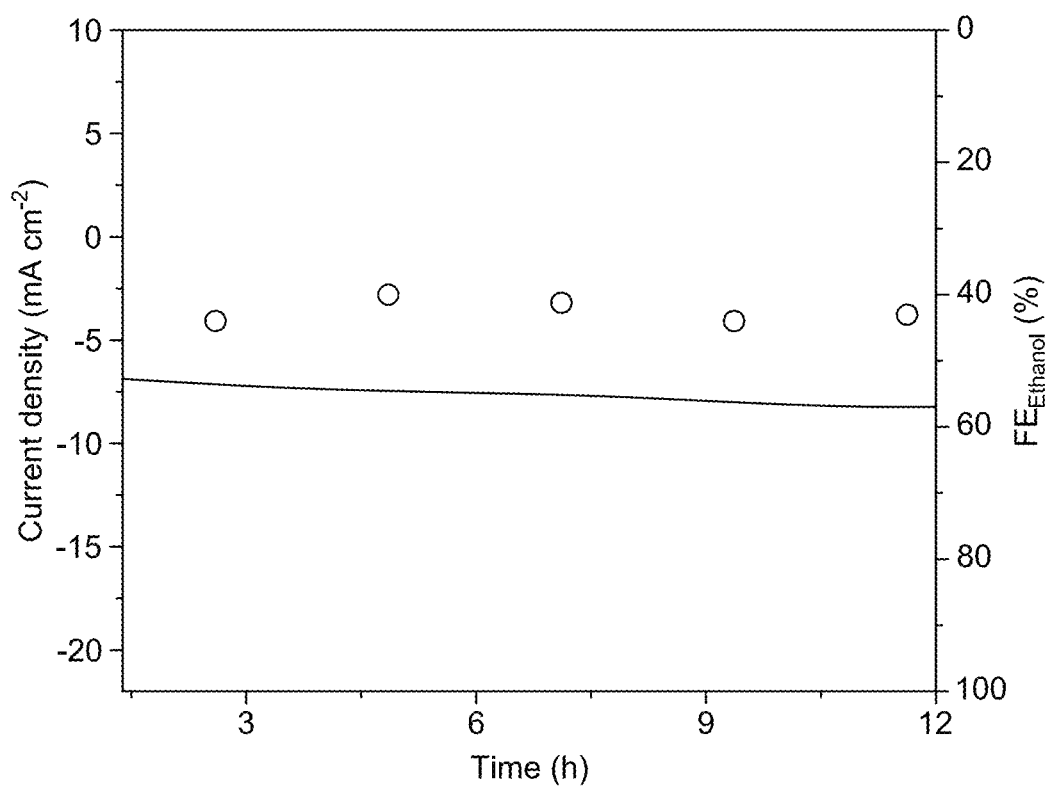
FIG. 7 shows a chronopotentiometry curve for determining the long-term stability of the 10% Ag—Cu-MeI, according to certain embodiments.

The faradaic efficiencies (FE) of the obtained electrodes were calculated by running the chronoamperometry for 60 min while connecting the H-cell to the GC-BID to investigate the gaseous products, and the liquid sample was collected to determine the liquid products using $^1$H-NMR (water suppression method). In sample Cu-MeI (FIG. 6A), three products were observed: $H_2$, CO, and HCOOH. The HCOOH ratio was increasing with the potential to reach FE % of 57% at −1.0 V RHE; after that, it decreased due to an increase in the $H_2$ ratio from the hydrogen evolution reaction (HER). The trend was the same after introducing a small amount of Ag in 5% Ag—Cu-MeI (FIG. 6B); however, the CO and HCOOH FE % increased. In sample 10% Ag—Cu-MeI (FIG. 6C), ethanol started appearing as the liquid product with a ratio of 40% at a potential of −1.0 V RHE. In sample 20% Ag—Cu-MeI (FIG. 6D), the ethanol FE % was less; the further increase in Ag ratio could explain this increase in CO formation. The electrode durability was investigated using chronoamperometry (FIG. 7) in 0.5 M $KHCO_3$. The long-term current time curve revealed good stability for 12 h with no significant loss in the current or the product formation.

To conclude, a simple method to prepare bi-metallic Ag and Cu complexes, with different ratios, using melamine as a complexation agent was performed. The catalysts were investigated in the efficient $CO_2$ electroreduction. Compared to the bare Cu-MeI, the Ag—Cu-MeI demonstrated enhanced $ECO_2RR$ efficiency and selectivity toward ethanol production with FE % of 40% at −1.0 V.

Numerous modifications and variations of the present disclosure are possible in light of the above teachings. It is therefore to be understood that within the scope of the appended claims, the invention may be practiced otherwise than as specifically described herein.

the invention claimed is:

1. An aqueous electrolyte method of reducing carbon dioxide, comprising:
    applying a potential of −0.1 to −2.0 V vs RHE to an electrochemical cell,
    wherein the electrochemical cell is at least partially submerged in an aqueous solution saturated with carbon dioxide,
    wherein on applying the potential the carbon dioxide is reduced to a conversion product,
    wherein the electrochemical cell includes:
    an electrode; and
    a counter electrode,
        wherein the electrode includes:
            a catalyst; and
            a substrate,
    wherein the catalyst is dispersed on a surface of the substrate,
    wherein the catalyst, includes:
        silver;
        copper; and
        melamine,
        wherein the catalyst includes 45-55 wt. % N, 15-25 wt. % of the Cu, 15-25 wt. % Cl, 5-15 wt. % O, and 1-5 wt. % of the Ag, based on a total weight of the catalyst,
    wherein the catalyst is in the form of particles having a polygonal shape and an average size of 0.5-3 µm, and
    wherein the copper and the silver form a complex with the melamine.

2. The method of claim 1, wherein the particles of the catalyst have a polygonal shape having 4-10 sides.

3. The method of claim 1, wherein the particles of the catalyst have a rectangular shape with an average length of 0.5-1.5 µm.

4. The method of claim 3, wherein the particles of the catalyst are aggregated on a surface of the substrate forming aggregates with an average size greater than 3 µm.

5. The method of claim 1, wherein the copper is coordinated to at least one nitrogen atom in a melamine molecule and the silver is coordinated to at least one nitrogen atom of a different melamine molecule in a complex.

6. The method of claim 1, wherein the copper is coordinated to at least one nitrogen atom in a melamine molecule and the silver is coordinated to at least one nitrogen atom of a same melamine molecule in a complex.

7. The method of claim 1, wherein the catalyst is made by a method comprising:
    mixing a copper salt, a silver salt, and the melamine and heating to a temperature of 75-150° C. for at least 10 hours (h) to form a reaction mixture; and
    separating the catalyst from the reaction mixture.

8. The method of claim 7, wherein the copper salt is copper chloride and the silver salt is silver nitrate.

9. The method of claim 8, wherein a chloride of the copper chloride remains coordinated to the copper in a complex with the melamine, and wherein a nitrate of the silver nitrate remains coordinated to the silver in the complex with the melamine.

10. The method of claim 1, wherein the substrate of the electrode is made from at least one material selected from the group consisting of conductive carbon, stainless steel, aluminum, nickel, copper, platinum, zinc, tungsten, and titanium.

11. The method of claim 1, wherein the aqueous solution further comprises a base selected from at least one of sodium bicarbonate and potassium bicarbonate.

12. The method of claim 1, wherein the conversion product is at least one selected from formic acid, carbon monoxide, hydrogen gas, and ethanol.

13. The method of claim 1, wherein the conversion product is ethanol, and
wherein the method has a faradaic efficiency (FE) for reducing the carbon dioxide to ethanol of 35% to 45% at −1.0 V vs RHE.

14. The method of claim 1, wherein the conversion product is formic acid, and wherein the method has a FE for reducing the carbon dioxide to formic acid of 20-30% at −1.0 V vs RHE.

15. The method of claim 1, wherein the conversion product is carbon monoxide, and wherein the method has a FE for reducing the carbon dioxide to carbon monoxide of 5-15% at −1.0 V vs RHE.

16. The method of claim 1, wherein the conversion product is hydrogen gas, and wherein the method has a FE for reducing the carbon dioxide to hydrogen gas of 5-15% at −1.0 V vs RHE.

17. The method of claim 1, wherein the conversion product includes two carbon atoms.

18. The method of claim 1, wherein the aqueous solution consists of water and the carbon dioxide.

* * * * *